Sept. 4, 1962 R. J. LENDER 3,052,847
ELECTRICAL INSTRUMENT
Filed Aug. 26, 1959 2 Sheets-Sheet 1
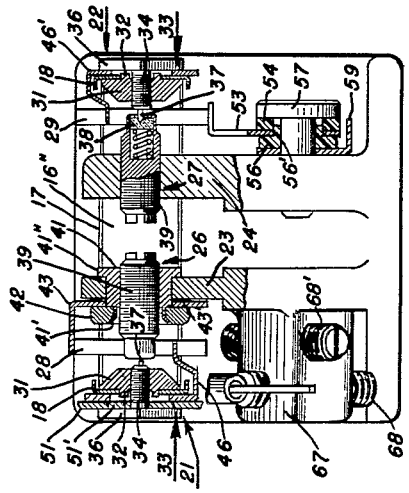
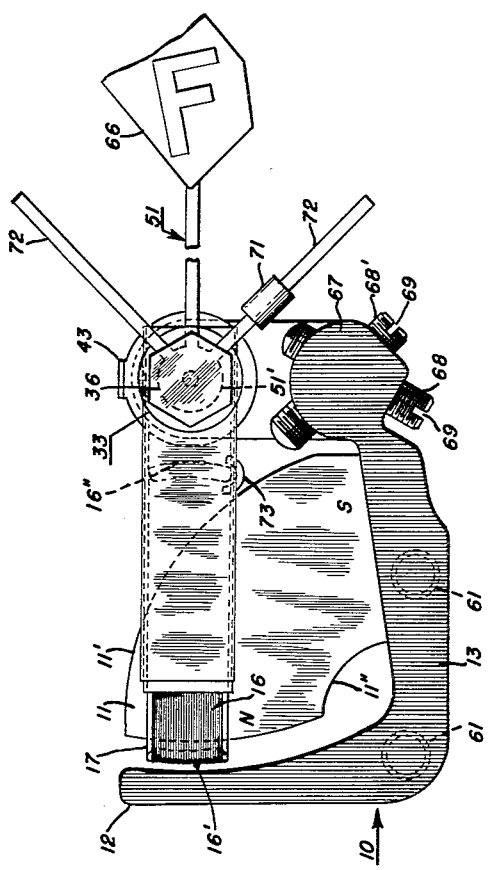
ROBERT J. LENDER
INVENTOR.

Sept. 4, 1962　　　　　R. J. LENDER　　　　　3,052,847
ELECTRICAL INSTRUMENT

Filed Aug. 26, 1959　　　　　　　　　　　　2 Sheets-Sheet 2

ROBERT J. LENDER
INVENTOR.

BY
ATTORNEY

United States Patent Office 3,052,847
Patented Sept. 4, 1962

3,052,847
ELECTRICAL INSTRUMENT
Robert J. Lender, Cranford, N.J., assignor to Daystrom Incorporated, Murray Hill, N.J., a corporation of Texas
Filed Aug. 26, 1959, Ser. No. 836,148
4 Claims. (324—151)

This invention relates to an electrical instrument and more particularly to a permanent magnet, movable coil instrument having an improved magnetic system and coil construction.

Instruments of the class contemplated by this invention comprise a permanent magnet spaced from a soft-iron yoke to form a magnetic flux gap. A wire wound movable coil is pivotally mounted for rotation in the flux gap in response to current conducted to the coil through spiral hair springs. A flag is secured to the movable coil and is movable into and out of view of an observer. In certain applications as, for example, aircraft flag mechanisms, the angular deflection of the pointer may be relatively small but the instrument should have a relatively high torque, small overall size and light weight. To meet these requirements, it is accepted practice to provide an instrument mechanism wherein the entire magnetic energy of the permanent magnet is concentrated in a single flux gap having an arcuate length slightly larger than the angular deflection range of the pointer. The movable coil is so mounted that only one side of the wire turns operates within the flux gap. Such instruments are known as single air gap, permanent magnet movable coil instruments. A single air gap instrument made in accordance with this invention offers advantages of simplicity of construction, a magnetic flux density substantially greater than similar prior art instruments, and a coil having shorter length end turns.

An object of this invention is the provision of a high torque electrical instrument mechanism employing a C-shaped magnet in the magnetic system thereof, the use of the C-shaped magnet resulting in a greater magnet length without increasing the overall length of the mechanism in the plane of the moving coil.

An object of this invention is the provision of an electrical instrument having a movable coil which surrounds only the instrument magnet whereby the coil end turns are of a minimum length.

An object of this invention is the provision of a pivot assembly for an electrical instrument which includes a coil having a bracket extending therefrom, the said pivot assembly including an internally threaded hub secured to the said bracket, a bushing comprising an externally threaded shank having a head on one end thereof and a pivot extending from the other end, which threaded shank threadedly engages the hub and is adapted to support a spring abutment between the said shank head and coil bracket.

These and other objects and advantages will become apparent from the following description when taken with the accompanying drawings. It will be understood the drawings are for purposes of illustration and are not to be construed as defining the scope or limits of the invention, reference being had for the latter purpose to the appended claims.

In the drawings wherein like reference characters denote like parts in the several views:

FIGURE 1 is a top plan view of the essential elements of an electrical instrument embodying my invention;

FIGURE 2 is a side view of the mechanism as viewed from the right in FIGURE 1, with parts shown broken away for clarity;

Figure 3:
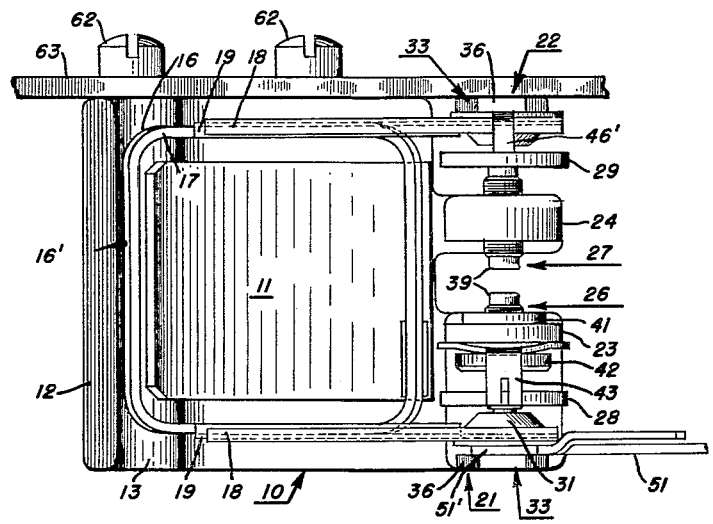
FIGURE 3 is a fragmentary side view of the mechanism as viewed from above in FIGURE 1 and showing the instrument secured to a mounting plate.

Reference is now made to the drawings wherein there is shown an electrical instrument which embodies my invention, which instrument includes a magnetic structure comprising a one piece yoke 10 and a magnet 11. The yoke is of an L-shape having a vertically extending section 12 and a horizontal section 13 extending from one end thereof, as viewed in FIGURE 1. The magnet 11 is of a C-shape, and includes a pair of generally concentric arcuate surfaces 11' and 11" extending between the polar surfaces. The magnet may be magnetized as indicated, for example, by the polar markings N and S shown in FIGURE 1, the magnet polar surface being located in generally right angularly disposed planes. The one polar surface of the magnet 11 is flat and abuts the inner surface of the horizontal leg portion 13 of the yoke 10 and is secured thereto by cementing, soldering, or the like. The other polar surface of the magnet 11, which is convexly curved, is spaced from the concavely curved inner surface of the vertical leg 12 of the yoke 10 to thereby form an arcuate flux gap within which one side 16' of the movable coil 16 may operate. Obviously, if desired, the curved polar surface could be made plane and a suitably curved pole shoe, or piece, secured thereto whereby the flux gap would be formed between the yoke and pole shoe. Unlike prior art single flux gap instruments, the coil 16 of my mechanism surrounds only the C-shaped magnet 11; it being understood that in prior art instruments of this type, the coil generally either surrounds also a portion of the instrument yoke or the instrument bridge. Since the coil only surrounds the magnet 11 in my design, the coil end turns are relatively shorter than the end turns of the coils employed in prior art single flux gap mechanisms and, consequently, less copper is wasted in the shorter coil end turns.

The coil 16 may be wound upon a coil frame 17 made of aluminum, or other suitable non-magnetic material. Since the ends of the coil frame are also of a minimum length, the resistance of such frame is reduced to a minimum whereby maximum damping is obtained, as will be understood by those skilled in this art.

The coil 16 and frame 17 are supported by a pair of bracket supports 18, 18 of U-shaped cross-section for strength, attached to the ends of the coil and frame, as by cementing or other suitable means, and extending outwardly beyond the one coil side designated 16". Insulating members 19, 19 are positioned between the channel-shaped supporting brackets 18, 18 and the coil ends. Novel coil pivot assemblies 21 and 22 are secured by the extending arm portions of the brackets 18, 18, which pivot assemblies are described in detail hereinbelow.

A novel bridge construction for the pivotal support of the coil 16 includes a pair of spaced cantilever bridge members 23 and 24 integrally formed on the horizontal leg portion 13 by the yoke 10 at the end opposite the leg portion 12 and extending in the same direction as the said leg portion 12. The bridge members 23 and 24 carry bearing assemblies 26 and 27, respectively, for the support of pivots included in the pivot assemblies 21 and 22. The generally parallel, spaced, bridge members, as seen in FIGURES 2 and 3 are located a spaced distance from the top and bottom of the instrument to provide room for the upper and lower spiral springs 28 and 29, respectively; the said upper spiral spring 28 being located between the bridge member 23 and the upper bracket support 18 while the spiral spring 29 is located between the lower bridge member 24 and the lower bracket support 18. The upper spiral spring 28 surrounds portions of the upper pivot and bearing assemblies 21 and 26, respectively, while the lower spiral spring 29 surrounds portions of the lower pivot and bearing assemblies 22 and 27, respectively.

The novel pivot assemblies 21 and 22 each comprise an internally threaded hub 31 non-rotatably supported in coaxial holes formed in the coil supporting brackets 18. To this end, the hubs may be provided with axial shank portions 32 press-fitted in the said coaxial bracket holes. Bushings 33, each comprising an externally threaded shank portion 34 and hexagonal head 36, extend through the hubs 31 with the shank portion 32 in threaded engagement with the said internally threaded hubs. Each bushing 33 is provided with an axial bore at the inner end thereof to receive a pivot 37. The pivots operated within spring-backed jewels 38 carried by the externally threaded jewel screws 39, 39, only the jewel 38 in the lower jewel screw being shown in the sectional portion of FIGURE 2. The lower jewel screw 39 is threaded into an internally threaded hole formed in the lower bridge member 24, while the upper jewel screw 39 is threaded into a bushing 41 secured firmly within a hole in the upper bridge member 23. A disc 42 is secured to the bushing 41 by spinning over the end of the axial flange 41' of the said bushing. A radial flange 41" on the bushing abuts the bridge member 23 at one side thereof, and a spring abutment and zero adjusting member 43 is located between the disc 42 and other side of the bridge member 23. The member 43 is provided with resilient arm portions 43' about the hole formed therein whereby the said member is rotatably adjustable about the instrument pivot axis. The outer end of the upper spiral spring 28 is secured, as by soldering, to the axially extending arm of the abutment 43, while the inner end of the spiral spring 28 is secured to a shaped lug, or spring abutment 46. The abutment 46, and the hub portion 51' of the instrument pointer system, designated 51, are coaxially mounted on the shank portion 34 of the upper pivot bushing 33 between the head 36 of such bushing and the upper channel bracket 18. By tightening the threaded bushing 33 into the hub 31, the pointer system and spring abutment are maintained in a non-rotatable relation with respect to the said coil supporting brackets 18. Although not shown in the drawings, it will be understood that the one end of the movable coil wire is soldered to the upper channel bracket 18 while the other wire end is soldered to the lower such bracket. Thus, it will be apparent that one end of the coil wire connected to the upper bracket 18 is grounded; the electrical circuit being traced from the upper bracket 18 to the spring abutment 46, through the spiral spring 28 to the abutment and zero adjusting lever 43, and thence to the bridge member 23 and integral yoke 10.

The lower bracket 18 must, obviously, be insulated from the upper bracket since the electric current to the coil is conducted therethrough. For this purpose, the lower spiral spring is insulated from the instrument yoke. It will be noted that the construction at the lower pivot assembly 22 is similar to that at the upper pivot assembly 21 except that no pointer system is included thereat. That is, the spring abutment designated 46' is mounted between the head 36 of the lower pivot bushing 33 and the lower coil supporting bracket 18.

The construction of the above-described pivot assemblies differs from prior art pivot assemblies in that they include a bushing having an externally threaded shank with a head formed at one end thereof, with spring abutment members 46 and 46' mounted on the said shank portion between the head and coil supporting brackets 18, 18. Unlike prior art pivot assemblies, no nut is located on the threaded shank portion to hold the spring abutment. With my design, the internally-threaded hubs 31, 31 are non-rotatably secured to the coil supporting brackets 18, 18, and the bushings 33, 33 are threadedly secured therein, with the spring abutments positioned between the bushing head and coil supporting brackets. Such an assembly is extremely easy to assemble.

Figure 4:
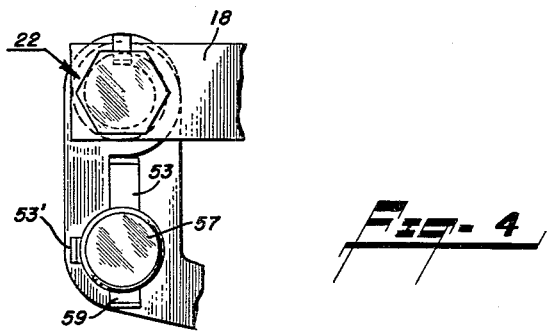
FIGURE 4 is a fragmentary bottom view of the mechanism.

The outer end of the lower spiral spring 29 is secured to a spring abutment 53 which is mounted between a pair of insulating washers 54 and 56, with an axial flange 56' on the washer 56 extending through the enlarged diameter hole in the abutment 53. A pin 57 extends through the insulating washers 54 and 56, the abutment 53, and through a terminal 59 which abuts the bridge member 24, with the pin press-fitted within a hole formed in the bridge member 24. Electrical connection to the instrument is made through the terminal 59 and the tab 53' (see FIGURE 4) on the abutment 53.

It will here be noted that by locating the spiral springs 28 and 29 inside of the extending ends of the channel brackets 18, 18, the springs are protected by such brackets from damage due to inadvertent touching and bending thereof, and the mechanism is, therefore, easily handled during the construction, installation and repair thereof without the necessity of special precautions.

The yoke member 10 is provided with a plurality of threaded mounting holes 61 (see FIGURE 1) for receiving bolts 62, or the like (FIGURE 3) for holding the yoke in place on a plane base plate or member 63 which may form a part of an electrical instrument housing, or the like. In accordance with my invention, no part of the instrument mechanism proper extends below the lower surface of the yoke 10 in which the holes 61 are formed. Thus, it will be understood that the instrument mechanism may be placed or mounted on a flat, plane, surface, such as the plate 63. Further, as seen in FIGURE 3, no part of the instrument mechanism proper extends above the top surface of the yoke 10. Thus, it will be apparent that mounting holes could be provided in the yoke at the top surface thereof and the mechanism secured to the flat mounting plate at the top side thereof. Regardless of where the mechanism is mounted, the instrument of my invention is characterized in that no part of the instrument proper extends above or below the top or bottom face of the yoke member 10. Obviously, the instrument pointer or flag 66 (FIGURE 1) may be shaped to extend above or below the plane of the top and bottom surfaces of the yoke member 10 without interfering with the mounting of the instrument mechanism on a plane, flat, mounting surface, and without departing from my invention.

The pointer stop construction includes a generally cylindrical-shaped member 67 integrally formed on the yoke 10 above the upper bridge member 23. A pair of diagonally oriented threaded through holes are formed in the member 67 for the reception of externally threaded screws 68 and 68'. The outer end of each of the screws is provided with a slot or kerf 69. A cylindrical bumper member 71, of suitable hard material, is secured to one of the extending balance arms 72 of the pointer system, against which member the end of the stop member 68 is adapted to abut to thereby limit the clockwise rotation of the pointer, as viewed in FIGURE 1. A semi-cylindrical bumper member 73 is suitably secured to the inner side 16" of the coil 16 and frame 17 against which bumper member the end of the other stop member 68' is adapted to abut to limit the counterclockwise movement of the movable coil system.

Several advantages are obtained by the use of the generally L-shaped yoke and C-shaped magnet construction, which advantages are not obtainable in prior art single air gap mechanisms. With such construction, for example, the magnetic length of the magnet is a maximum without increasing the overall length of the magnetic system in the plane of the moving coil. Further, as mentioned above, the magnet shape allows the coil to surround only the magnet 11 of the magnetic system of the mechanism whereby the coil end turns are of minimum length; the coil being displaced from the pivot axis of the instrument. The use of easily assembled pivot assemblies 21 and 22 on the coil brackets 18, 18 reduces the assembly time and cost of the instrument.

Having now described my invention in detail in accord-

I claim:

1. An electrical instrument having a magnetic system comprising a magnet having a generally C-shape with a pair of polar surfaces disposed in generally perpendicularly oriented planes, a unitary bridge and yoke secured to one polar surface of the magnet with the other polar surface of the magnet spaced from the yoke to form a magnetic flux gap the said yoke being generally L-shaped with one leg thereof being spaced from the magnet and the other leg thereof being secured to the magnet, the unitary bridge extending in a direction generally parallel with the said one leg of the yoke, and a movable coil pivotally supported on the said bridge, the said coil surrounding only the magnet of the instrument magnetic system with one side of the said coil being angularly movable in the said flux gap and the opposite side being movable between the said bridge and magnet.

2. The invention as recited in claim 1 wherein the said bridge comprises a pair of bridge members, a pair of outwardly facing jewel screws carried by the bridge members, and a pair of inwardly directed pivots secured to the coil and rotatably supported by the jewel screws.

3. An electrical instrument comprising a generally C-shaped magnet having a pair of polar surfaces interconnected by a pair of generally concentric arcuate surfaces of different radii, a generally L-shaped yoke of magnetic material having one leg thereof secured to one polar surface of the magnet and the other leg thereof spaced from the other polar surface of the magnet to form a magnetic flux gap, a coil wound upon a non-magnetic frame, a pair of supporting brackets attached to opposite ends of the said coil and extneding generally parallel therefrom, a pair of pivots secured to the said extending brackets a spaced distance from the coil sides, a bridge formed on the yoke, bearing assemblies carried by the bridge and pivotally supporting the said pivots, one side of the coil being angularly movable in the said flux gap and the opposite side being movable between the said bridge and magnet.

4. The invention as recited in claim 3 including a pointer carried by the coil, a pointer stop carrying member integrally formed on the yoke, means forming a pair of diagonally oriented threaded through holes in the said member, a pair of externally threaded pointer stops supported in the holes in the member to limit relative rotary movement of the said coil, rotary movement of the coil in one direction being limited by abutment of the coil against one pointer stop, and rotary movement of the coil in the other direction being limited by abutment of the pointer against the other pointer stop.

References Cited in the file of this patent
UNITED STATES PATENTS

| | | |
|---|---|---|
| 2,367,950 | Lenehan | Jan. 23, 1945 |
| 2,422,714 | Bigelow | June 24, 1947 |
| 2,823,353 | Bakke | Feb. 11, 1958 |
| 2,875,410 | Lamb | Feb. 24, 1959 |
| 2,887,656 | Barry | May 19, 1959 |
| 2,896,167 | Huber | July 21, 1959 |

FOREIGN PATENTS

| | | |
|---|---|---|
| 941,985 | Germany | Apr. 26, 1956 |